United States Patent [19]

McAllister

[11] 4,249,139
[45] Feb. 3, 1981

[54] $CO_2$ LASER EMITTING AT 16 MICRONS IN 02°0-01'0 TRANSITION

[75] Inventor: Gary L. McAllister, Richland, Wash.

[73] Assignee: Jersey Nuclear-Avco Isotopes, Inc., Bellevue, Wash.

[21] Appl. No.: 861,986

[22] Filed: Dec. 19, 1977

[51] Int. Cl.$^2$ ............................................. H01S 3/09
[52] U.S. Cl. ......................... 331/94.5 P; 331/94.5 G; 331/94.5 PE
[58] Field of Search ..................... 331/94.5 G, 94.5 P, 331/94.5 PE

[56] References Cited

U.S. PATENT DOCUMENTS

| | | | |
|---|---|---|---|
| 4,053,851 | 10/1977 | Krupke | 331/94.5 G |
| 4,063,190 | 12/1977 | Rink | 331/94.5 G |
| 4,068,194 | 1/1978 | Malarkey | 331/94.5 G |

OTHER PUBLICATIONS

D. K. Rice, "Carbon Monoxide Spectral Line Selection Studies," *Northrup Corporation Technical Report*, NLSD 72-13R, Aug. 1972 pp. 44-55.

R. M. Osgood, Jr. "Optically Pumped 16-um Co$_2$ Laser" *Applied Physics Letters*, vol. 28, No. 6, Mar. 15, 1976, pp. 342-347.

T. J. Manuccia et al., "14-and 16-u Gasdynamic $CO_2$ Lasers," *Applied Physics Letters*, vol. 29, No. 6, Sep. 15, 1976, pp. 360-362.

W. H. Kasner et al., "Electrical Discharge Excited 16 um $CO_2$ Laser", 1977 IEEE/OSA Conference on Laser Engineering and Applications, Digest of Technical Papers, Jun. 1-3, 1977, p. 12.

*Primary Examiner*—James W. Davie
*Attorney, Agent, or Firm*—Weingarten, Maxham & Schurgin

[57] ABSTRACT

A $CO_2$ laser capable of emitting at 16 microns in the transition from the 02°O to the 01'0 energy levels. The laser is particularly adaptable for use in laser enrichment to photoexcite uranium hexafluoride molecules. The $CO_2$ medium is originally excited to many levels above and including the 02°0 level. De-excitation to the 02°0 level is induced from several upper levels populating it highly for improved laser gain. The transition between the 02°0 and 01'0 levels at 16 microns is then permitted by depopulating the 01'0 level with 5 micron radiation from a CO laser. In the preferred case, excitation of the $CO_2$ medium is by an electronic discharge, and all levels are excited from the ground state by the discharge without selectivity. The pumping from the terminal 01'0 level maintains the inversion for 16 microns lasing.

24 Claims, 2 Drawing Figures

$CO_2$ LASER EMITTING AT 16 MICRONS IN $02°0$-$01'0$ TRANSITION

FIELD OF THE INVENTION

The present invention relates to the generation of 16 micron laser radiation and in particular such radiation from a $CO_2$ laser.

CROSS-REFERENCE TO RELATED APPLICATIONS

This application is a companion application to my application Ser. No. 861,985 filed Dec. 19, 1977, entitled CO PUMPED $CO_2$ 16 MICRON LASER.

BACKGROUND OF THE INVENTION

In isotope separation where an environment of uranium hexafluoride molecules is to be enriched in a selected uranium isotope by selectively photoexciting molecules having that isotope, it is frequently desirable to employ 16 micron radiation, appropriately tuned to selectively photoexcite the molecules with the desired atoms. While lasers exist capable of generating 16 micron radiation for this purpose, such as the TEA $CO_2/SF_6$ laser, or the gas dynamic $CO_2$ laser, or the hydrogen bromide pumped $CO_2$ laser, greater efficiency is desired, paricularly in operating on the $02°0$ to $01'0$ transition.

A difficulty which is encountered in such lasers is the loss of an inversion between the two levels separated by 16 microns of energy. This results in the premature cessation of laser radiation when the $01'0$ level reaches some population level equal to that of the $02°0$ level.

In addition, prior schemes have been inefficient not only in the actual output power generated from the $CO_2$ laser at 16 microns, but also in the utilization of pumping energy. In the case of pumping by optical means from an excitation laser, this is particularly wasteful in that the laser radiation employed for excitation is normally relatively expensive per photon. On the other hand, other pumping techniques such as found in the gas dynamic laser or electric discharge excitation, tend to be unselective, populating a whole succession of levels, thereby preventing the necessary population inversion between the $02°0$ and $01'0$ levels necessary for 16 micron radiation. Since the $01'0$ level has a long lifetime, over one second, continuous pulsed operation of the laser for any appreciable pulse duration is inhibited by a terminal block at the $01'0$ level.

SUMMARY OF THE INVENTION

The deficiencies in prior art 16 micron $CO_2$ lasers alluded to above are largely overcome in accordance with the teaching of the present invention in which the terminal block or bottleneck in the $01'0$ level of a 16 micron radiation $CO_2$ laser is avoided by optically pumping the $01'0$ level to a higher energy level, typically using a CO laser operating at 5 microns. This permits not only more efficient, long-duration, pulsed operation, but also facilitates the use of more efficient pumping techniques such as electric discharge pumping which would inherently populate not only the $02°0$ level, but also the $01'0$ level, as well as higher levels such as the $00°1$ level. To increase lasing output, the $00°1$ level is de-excited to the $02°0$ level by internal resonance at 10 microns, or externally applied 10 micron radiation. Where nitrogen as a carrier gas is mixed with the $CO_2$, $V=1$ $N_2$ levels collisionally excite the $00°1$ level in $CO_2$ to further increase available 16 micron emission. There results an efficient system for pumping particles into the $02°0$ level and extracting them from the $01'0$ level so as to maintain the population inversion necessary to lasing.

This 16 micron excitation scheme also permits high pressure operation, approaching atmospheric pressure, increasing the tuneability of the 16 micron emission through pressure broadening. In addition, since the only laser pumping radiation employed is from CO or $CO_2$ lasers, both of which are highly efficient and well-known, the pump lasers do not contribute to a loss of efficiency in the overall system. Finally, the electrical excitation to the $00°1$ level, as well as other levels which may be populated randomly, is highly efficient. As a result, a respectable overall quantum efficiency is achievable.

BRIEF DESCRIPTION OF THE DRAWING

These and other features of the present invention are more fully set forth below in the solely exemplary detailed description and accompanying drawing of which.

DETAILED DESCRIPTION OF THE INVENTION

The present invention contemplates a system for making efficient use of the $02°0$ to $01'0$ transition in $CO_2$ for the production of 16 micron radiation. In particular, a strong population inversion between these two levels is maintained by exciting decayed molecules out of the lower level with a high efficiency CO laser and efficiently exciting higher levels with an electric discharge excitation source and inducing decay to the $02°0$ level such as by 10 micron resonance, or collisional energy transfer.

Figure 1:
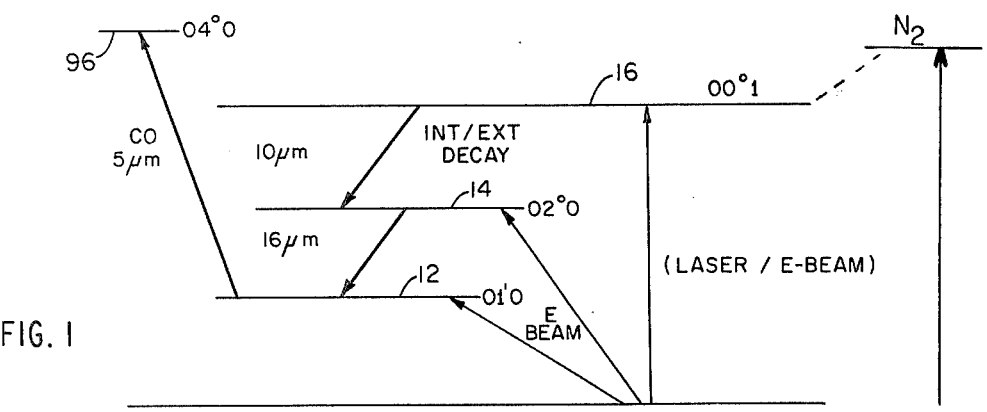
FIG. 1 is an energy level and transition diagram illustrating the concept and process of the present invention.

More particularly with reference to FIG. 1 showing an energy level and transition diagram, the process of the present invention is more clearly presented. As shown in FIG. 1, energy levels 12 and 14, corresponding to the $01'0$ and $02°0$ energy levels in carbon dioxide, are separated by approximately 16 microns. That is, where a population inversion is created between the levels 14 and 12, laser radiation at 16 microns can be expected to occur.

For application to isotope separation, and in particular to selective excitation of uranium hexafluoride molecules having the U-235 uranium isotope, tuneability is important in order to emit precisely at an absorption frequency near 628 $cm^{-1}$ for that desired molecule. Sufficient tuneability can be insured by the number of adjacent, rotational-vibrational states at each level in combination with a sufficient $CO_2$ pressure for the laser cell to insure pressure broadening, and thereby the effect of nearly continuous tuning over the 16 micron range of interest.

Lasing in the transition from the $02°0$ to the $01'0$ energy levels has been experienced in the prior art noted above, but always with certain limitations which have been determined to be due in part to the bottlenecking at the $01°0$ level 12. This level has such a long lifetime that it rapidly accumulates a high population of particles extinguishing the lasing by eliminating the inversion between the level 14 and itself.

To avoid this limitation, a relatively short wavelength, high energy 5 micron radiation is applied to the $CO_2$ environment of the laser cell to pump the particles from the level 12 to higher levels such as the rotational vibrational level near the 04°0 level. The existence of CO radiation at this range with high efficiency insures an effective removal of the terminal blockage from bottlenecking of the 01'0 level to maintain the population inversion.

In addition, while it is known to pump by laser excitation to the 00°1 level 16, such photoexcitation from laser sources is highly inefficient. It is preferable that an efficient excitation mechanism be employed, but such excitation mechanisms are not likely to be selective, thus populating many undesired levels. In accordance with the present invention, electric discharge excitation of the $CO_2$ medium is employed to excite very efficiently to the 00°1 level. While such non-selective broad band excitation will indeed populate the 01'0 level and the 02°0 level, such excitation is not the problem it could be in view of the removal of particles from the 01'0 level with the 5 micron CO laser radiation. In addition, it is desirable to stimulate decay from the 00°1 level 16 to the 02°0 level 14, an energy step of approximately 10 microns, in order to make additional particles available at the 02°0 level 14 for lasing and thereby improve gain. This is accomplished by stimulating the decay from the level 16 to the level 14 by either tuning the $CO_2$ cavity to resonate and emit at the 10 micron energy transition or by applying an external 10 micron beam from a $CO_2$ laser to stimulate that transition to the point where it saturates or equilibrates the populations of the levels 14 and 16. Additionally, nitrogen is preferably mixed with the $CO_2$ environment to absorb excitation at the $V=1(N_2)$ level that collisionally transfers to the $CO_2 00°1$ level and finally contributes to the 16 micron emission using the above-described decay.

Figure 2:
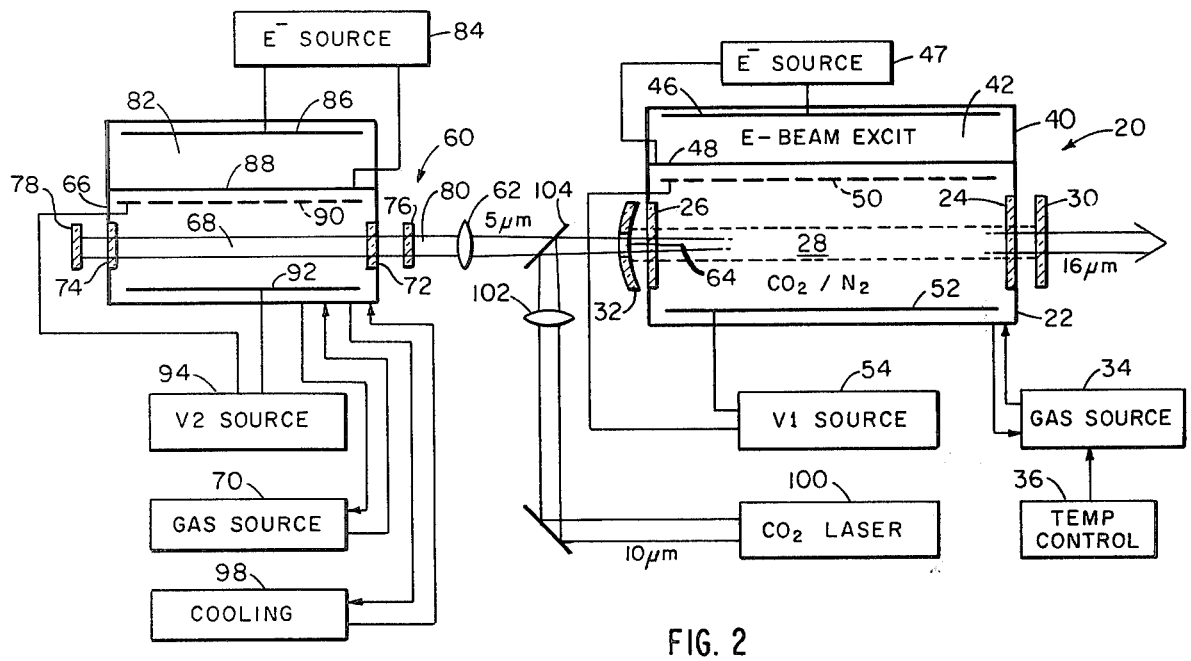
FIG. 2 is a laser structural diagram illustrating the apparatus employed in practicing the present invention.

The structure of apparatus employed for practicing the present invention may now be understood by reference to the schematic illustration of FIG. 2. As shown there, a laser 20 is provided within a housing 22 that includes windows 24 and 26 of potassium bromide preferably set at Brewster's angle and confining an active region 28 defined between external cavity mirrors 30 and 32. Mirror 30 acts as an output mirror and may be of KBr also. Mirror 32 is a concave hole coupling mirror. The active region 28 contains a mixture of carbon dioxide and nitrogen gases in the ratios of approximately 1:5. The gas mixture is pumped through the active region 28 by a source 34. The gas is maintained at approximately 300° K. in the region 28 and for this purpose, a temperature controller 36 may be provided to cooperate with gas source 34. The gas pressure is in the range of 1 to 1,000 torr.

Excitation of the carbon dioxide within the region 28 is preferably achieved by electric discharge energization. For this purpose, an electron generator 40 is located above the laser housing 22 and comprises a region 42 which in one embodiment is filled with a low pressure inert gas such as helium through which an electric discharge is maintained between a cathode 46 and an anode 48. The cathode and anode are energized by voltage source 47 at approximately 200,000 volts across a 10 centimeter distance. Region 42 may alternatively be a vacuum with a cathode 46 provided as a hot or cold electron emitter. The anode 48 is a thin foil permitting the energetic electrons accelerated toward it to pass through, or eject further electrons, into the active region 28 where a sustainer voltage is applied between a cathode 50 and an anode 52 at opposite sides of the region 28 at approximately 5,000 volts, or 1 KV per centimeter, by a voltage source 54. The electrons in region 28 support a current flow that provides the unselective excitation of $CO_2$ and $N_2$. Additional details on electric discharge lasers of this sort may be found in *Applied Optics*, Volume 14, No. 6, June, 1975, in an article by G. L. McAllister, V. G. Draggoo and R. G. Eguchi, entitled "Acoustic Wave Effects on the Beam Quality of a High Energy CO Electric Discharge Laser," and in *IEEE Journal of Quantum Electronics*, Vol. QE-11, No. 6, June 1975, in an article by Lacina and McAllister, for techniques to optimize a CO electric laser.

In order to eliminate the terminal blockage or bottleneck at the level 12, 5 micron radiation from a CO laser 60 is applied through a converging lens 62 which may be of calcium fluoride and central aperture 64 in the cavity mirror 32 into the active lasing region 28 of the $CO_2$ laser 20. The carbon monoxide laser 60 is substantially similar to the carbon dioxide laser 20 having a housing 66 within which a region 68 of active lasing material, carbon monoxide in combination with an argon or nitrogen diluent, is supplied through a gas source 70. The housing 66 has calcium fluoride windows 72 and 74 on opposite ends to permit radiation to enter and exit the region 68 through the housing 66 and be reflected by cavity-defining calcium fluoride and metal mirrors 76 and 78, respectively. The mirror 76 forms an output mirror for beam 80 which is focused by the lens 62 into the $CO_2$ laser 20. Energization of the CO 60 laser is provided by electrons generated within an electron source 82 by a discharge through a helium gas or vacuum as described above. A 200 KV voltage source 84 applies that potential between a cathode 86 and a foil anode 88, 10 centimeters apart. The electrons from the foil 88 pass into the region 68 where a sustaining voltage of approximately 1,000 volts per centimeter is provided between a cathode 90 and an anode 92 energized at 5,000 volts by a voltage source 94. The output beam 80 is established at 5 microns in order to drive the transition from the 01'0 level 12 to, for example, the 04°0 level 96 (FIG. 1). Preferably, the gas within the environment 68 is maintained at approximately 100 torr and the temperature at 100° K. In this case, a cooling system 98 is preferably provided in order to circulate a coolant fluid around the sides of the housing 66 to maintain this relatively low temperature. Temperature and pressure combine to define the particular vibrational and rotational levels respectively for the radiation in the beam 88.

It is further preferable that 10 micron radiation be supplied within the region 28 of the $CO_2$ laser 20 in order to drive the transition from the excited state 16 to the upper-end level 14 of the 16 micron transition. This may be achieved by tuning the cavity within the region 28 as defined by the mirrors 30 and 32 to resonance, additionally at 10 microns corresponding to the energy shift from the 00°1 level to the 02°0 level. Alternatively, a separate $CO_2$ laser 100 may be provided to emit radiation in the 10 micron region which will stimulate the same transition. In either case, the decay from the level 16 to the level 14 will proceed so long as the population inversion exists between those two levels, that is, the resonance condition or extra radiation will trigger lasing at that frequency so long as the inversion exists. This tends to populate the level 14 more highly, augmenting the population inversion to level 12, and insuring improved lasing efficiency at 16 microns by making available as many particles at the level 14 as can be taken from the level 16.

For this purpose, the radiation from laser 100 is converged by calcium fluoride lens 102 and combined with beam 80 by dichroic or beam splitter element 104.

The presence of the nitrogen diluent with the $CO_2$ in region 28 adds additional particles to the molecules available for radiative decay by absorbing electric discharge energy that excites them to the $V=1$ energy state. From here, the $N_2$ molecules collisionally excite the 00°1 $CO_2$ level which is decayed at 10 microns to the 02°0 level 14 from which 16 micron radiation is generated.

In this preferred form, 16 micron radiation provided through the output mirror 30, which may include filtration to eliminate other frequencies of radiation existing within the region 28, is provided in an efficient utilization of the transition from the 02°0 state to the 01'0 state. The only laser sources are $CO_2$ or CO lasers which are highly efficient, and in combination with the efficient electron excitation, permits a high quantum efficiency for the $CO_2$ laser 20 on the whole.

It is additionally noted that, while not preferred, the excitation of the $CO_2$ laser 20 instead of electron-driven may be photo-induced as by the provision of a hydrogen bromide laser.

The above-described embodiment is presented for purposes of exemplifying the invention and not limiting it to alternatives and improvements which fall within the scope of the following claims.

What is claimed is:

1. A $CO_2$ laser for emitting 16 micron radiation comprising:
   optical resonant cavity means;
   optically coupled to said cavity, a $CO_2$ lasable medium having a 16 micron transition between a first and a relatively higher second excited state;
   means for exciting said medium to said second excited state;
   means for inducing a 16 micron radiation transition from said second to said first excited state; and
   optical pumping means for selectively depopulating said first excited state to maintain a population inversion between said first and second states.

2. The laser of claim 1 further including:
   means for exciting said medium to a third excited state above said second excited state; and
   means for producing a transition in the particles in said third excited state to said second excited state.

3. The laser of claim 2 wherein said third excited state includes the 00°1 level.

4. The laser of claim 1 wherein said first and second excited states include the 01'0 and 02°0 levels respectively.

5. The laser of claim 1 wherein said exciting means includes a laser.

6. The laser of claim 1 wherein said exciting means includes means for producing electric discharge excitation.

7. The laser of claim 6 wherein said electric discharge excitation means includes means for directing high energy electrons into said medium.

8. The laser of claim 7 further including means for driving a current in said medium in the presence of said electrons.

9. The laser of claim 1 wherein said cavity for said medium is resonant to the frequency of said transition to said first state from said second state.

10. The laser of claim 2 wherein said means for producing the transition between said third and second excited states includes means for producing approximately 10 micron radiation in said medium.

11. The laser of claim 2 wherein said means for producing said transition between said third and second excited states includes a $CO_2$ laser.

12. The laser of claim 10 further comprising a cavity resonant with the transition between said third and second excited states.

13. The laser of claim 1 wherein said depopulating means includes means for generating laser radiation of approximately 5 micron energy.

14. The laser of claim 13 wherein said generating means includes a CO laser.

15. The laser of claim 14 wherein said CO laser includes means for producing electric discharge excitation thereof.

16. The laser of claim 15 wherein said electric discharge excitation producing means includes means for applying energetic electrons to the CO medium of said CO laser.

17. The laser of claim 2 wherein:
   said medium includes nitrogen; and
   said exciting means includes means for exciting the nitrogen of said medium to an excited state which collisionally excites said third excited state.

18. The laser of claim 1 wherein said exciting means includes means for exciting both of said first and second excited states.

19. The laser of claim 1 further including means for maintaining an approximate temperature of 300° K. for said medium.

20. The laser of claim 1 further including means for flowing said medium at a pressure of approximately 1 to 1,000 torr.

21. A process for emitting 16 micron radiation in a $CO_2$ lasable medium having a 16 micron transition between a first and a relatively higher second excited state, said process including the steps of:
   exciting said medium to said second excited state and to a third excited state above said second excited state;
   producing a transition in the particles in said third excited state to said second excited state;
   inducing a transition from said second to said first excited state which emits 16 micron radiation; and
   depopulating said first excited state by exciting said medium in said first excited state to a higher excited state to maintain a population inversion between said first and second states.

22. A $CO_2$ laser for emitting 16 micron radiation comprising:
   optical resonant cavity means;
   optically coupled to said cavity, a $CO_2$ lasable medium having a 16 micron transition between a first and a relatively higher second excited state;
   electric discharge means for exciting said medium to a third excited state higher than said second excited state;
   means for producing a transition from said third excited state to said second excited state;

means for inducing a 16 micron transition from said second excited state to said first excited state; and optical pumping means for depopulating said first excited state in order to maintain a population inversion between said first and second states.

23. The laser of claim 22 wherein said electric discharge excitation means comprises means for directing high energy electrons into said medium.

24. The laser of claim 23 further including means for driving current into said medium in the presence of said electrons.

* * * * *